United States Patent [19]
Brown

[11] Patent Number: 5,177,978
[45] Date of Patent: Jan. 12, 1993

[54] AUXILIARY ENGINE IDLING SYSTEM

[76] Inventor: Clifford D. Brown, 2411 Quail Run Ct., Ardmore, Okla. 73402

[21] Appl. No.: 738,244

[22] Filed: Jul. 29, 1991

[51] Int. Cl.$^5$ .......................... F25B 27/00; B60H 1/32
[52] U.S. Cl. .......................................... 62/236; 62/239
[58] Field of Search ................. 62/236, 239, 243, 244, 62/323.1; 60/698, 716

[56] References Cited

U.S. PATENT DOCUMENTS

| | | | |
|---|---|---|---|
| 1,944,256 | 1/1934 | Miller et al. | 123/2 |
| 2,363,974 | 11/1944 | Kirkpatrick | 62/129 |
| 2,986,896 | 6/1961 | Hann | 62/236 X |
| 3,646,773 | 3/1972 | Falk et al. | 62/236 X |
| 3,841,108 | 10/1974 | Pierrat | 62/239 X |
| 4,217,764 | 8/1980 | Armbruster | 62/323 |
| 4,271,677 | 6/1981 | Harr | 62/127 |
| 4,448,157 | 5/1984 | Eckstein et al. | 123/142.5 |
| 4,531,379 | 7/1985 | Diefenthaler, Jr. | 62/236 |
| 4,682,649 | 7/1987 | Greer | 165/43 |
| 4,732,229 | 3/1988 | Lucht | 180/69.6 |
| 4,825,663 | 5/1989 | Nijjar et al. | 62/236 |

*Primary Examiner*—Allen M. Ostrager
*Attorney, Agent, or Firm*—Richards, Medlock & Andrews

[57] ABSTRACT

An auxiliary power system for delivering power to the fan hub of a vehicle engine and to the air conditioning compressor and alternator of the vehicle is provided. The system includes an auxiliary engine which powers an hydraulic pump. Hydraulic fluid is directed from the hydraulic pump to an hydraulic motor under pressure. A first clutch assembly is provided in order to engage and disengage the hydraulic motor from the fan hub of the vehicle. A second clutch assembly is provided in order to engage and disengage the crankshaft from the primary engine of the vehicle.

20 Claims, 1 Drawing Sheet

AUXILIARY ENGINE IDLING SYSTEM

TECHNICAL FIELD OF THE INVENTION

This invention relates to an auxiliary engine idling system for use with diesel engine trucks and is particularly directed to an auxiliary engine idling system that drives the air conditioning compressor and the alternator of the primary diesel engine during periods shutdown, thereby providing power for operation of the electrical and climate control functions of the truck as well as warming the primary diesel engine and fuel.

BACKGROUND OF THE INVENTION

The advantages of operating an auxiliary engine during periods of shutdown of the primary diesel truck engine are well known. Most auxiliary engine systems have been built for the purpose of operating the truck's electrical systems without the need for operation of the primary engine. Some auxiliary engine systems provide for the operation of climate control devices. As a result, such auxiliary engine systems have made it possible to heat or cool the cab of the truck as well as to provide electrical power at significantly less expense than would be associated with the idling of the primary engine. In addition, such systems reduce wear to the primary diesel engine caused by extended periods of idling and by cold starting.

Two examples of existing auxiliary engine systems are disclosed in U.S. Pat. No. 4,825,663 to Nijjar et al., "Auxiliary Air Conditioning System for Trucks and Other Heavy Duty Vehicles," and in U.S. Pat. No. 4,531,379 to Diefenthaler, Jr., "Auxiliary Power System for Vehicle Air Conditioner and Heater." Nijjar et al. show the use of a secondary engine which generates electrical power during periods of shutdown of the primary engine. The secondary engine is also used to drive an auxiliary air conditioning system associated with the Nijjar et al. auxiliary system. The coolant system of the secondary engine is connected to the coolant system of the primary engine in order to allow the primary engine to be warmed by waste heat from the secondary engine. Auxiliary systems such as that disclosed by Nijjar et al. add weight and expense to the operation and maintenance of the truck, particularly to the extent that they utilize redundant compressors, condensers, and pumps.

The auxiliary power system disclosed by Diefenthaler, Jr. utilizes a secondary motor to drive the compressor of the truck's air conditioning system thereby eliminating the need for an auxiliary compressor. Heat from the secondary engine is selectively delivered to either the interior of the truck or to a water tank. However, the Diefenthaler, Jr. system also employs some duplicative components, such as a redundant water pump and a redundant alternator.

SUMMARY OF THE INVENTION

The auxiliary power system of the present invention includes an auxiliary engine which drives an hydraulic pump which in turn provides power to an hydraulic motor. The hydraulic motor can be selectively connected to the fan hub of the primary engine through the use of an electromagnetic clutch mechanism. When the auxiliary power system is engaged, the auxiliary motor indirectly drives the fan hub of the primary engine which in turn powers the air conditioning compressor, the alternator, and other components of the primary engine. An auxiliary coolant system is interconnected to the coolant system of the primary engine in order to provide for the cooling of the coolant circulating through the primary and auxiliary engines as well as warming the primary engine.

BRIEF DESCRIPTION OF THE DRAWINGS

A more complete understanding of the present invention and its advantages will be apparent from the following detailed description read in conjunction with the accompanying drawings, in which.

DETAILED DESCRIPTION

Figure 1:
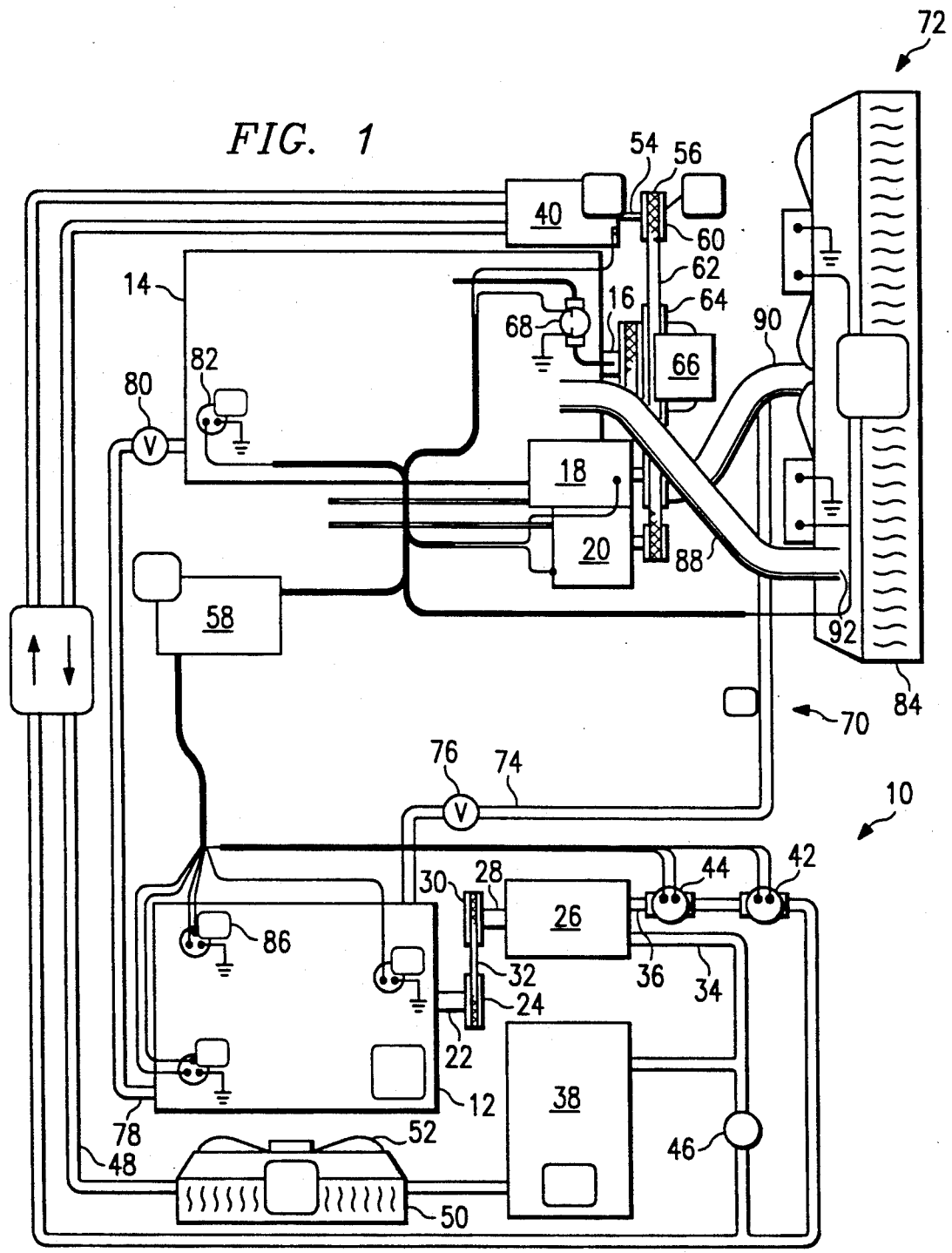
FIG. 1 is a schematic illustration of the auxiliary power system of the present invention.

The auxiliary power system of the present invention is generally indicated at 10 of FIG. 1. Auxiliary engine 12 can be disposed within the primary engine compartment of a vehicle or can be disposed in a location spaced from the primary engine compartment. In this way, auxiliary power system 10 can be used in vehicle despite the lack of available space adjacent the primary engine. For example, when auxiliary power system 10 is used in a truck tractor, auxiliary engine 12 can be disposed behind the cab of the truck tractor. Auxiliary engine 12 preferably has a mechanical capacity sufficient to pull main fan hub 16 of primary engine 14 during operation of air conditioner compressor 18 and alternator 20. It has been found that diesel engines having capacities as low as nine horsepower are sufficient for this purpose. However, in a preferred embodiment of the present invention, auxiliary engine 12 has a capacity of 11-13 horsepower in order to ensure proper operation.

Auxiliary engine 12 includes auxiliary crankshaft 22 having a pulley 24 mounted thereon. Hydraulic pump 26 includes a drive shaft 28 on which is mounted a pulley 30. Hydraulic pump 26 preferably has a capacity to develop a pressure of approximately 1500 p.s.i. within outgoing hydraulic line 36. Belt 32 connects pulley 24 and pulley 30 such that hydraulic pump 26 is driven when auxiliary diesel engine 12 is in operation. In an alternative embodiment of the present invention, drive shaft 28 of hydraulic pump 26 is connected directly to auxiliary crankshaft 22, thereby eliminating the need for pulleys 24, 30 and belt 32.

Hydraulic pump 26 causes hydraulic fluid to be drawn through incoming hydraulic fluid line 34 from hydraulic fluid reservoir 38. The hydraulic fluid is then forced by hydraulic pump 26 through outgoing hydraulic fluid line 36 which is connected at its distal end to hydraulic motor 40. In the preferred embodiment of the present invention depicted in FIG. 1, an hydraulic low pressure shutdown switch 42 is provided along outgoing hydraulic fluid line 36. Hydraulic low pressure shutdown switch 42 monitors the pressure within outgoing hydraulic fluid line 36 and signals hydraulic pump 26 to shut down when the outgoing hydraulic pressure is less than a predetermined minimum value.

An hydraulic pressure switch 44 is also provided in the preferred embodiment depicted in FIG. 1. Hydraulic pressure switch 44 monitors the pressure of hydraulic fluid within outgoing hydraulic fluid line 36. The purpose and function of switch 44 are discussed in detail below.

Pressure relief valve 46 is provided in order to prevent the development of excess hydraulic pressure within outgoing hydraulic line 36. As depicted in FIG.

1, hydraulic fluid released from outgoing hydraulic line 36 through pressure relief valve 46 enters hydraulic incoming line 34 and is returned to hydraulic pump 26 for subsequent circulation. It is to be appreciated that this release of hydraulic fluid through valve 46 will occur only when a predetermined level of pressure develops in outgoing hydraulic line 36. Pressure relief valve 46 can be of any known construction.

Hydraulic fluid returns to reservoir 38 from hydraulic motor 40 via hydraulic return line 48. Hydraulic return line 48 passes through hydraulic fluid cooler 50 as depicted in FIG. 1. Fan 52 is associated with hydraulic fluid cooler 50 to provide for cooling of the hydraulic fluid within return line 48. Fan 52 is driven by electrical power generated by alternator 20. Hydraulic fuel returning to reservoir 38 is thus cooled relative to the temperature of the fluid in return line 48. Hydraulic fluid reservoir 38 preferably includes a filter in order to remove foreign particles from the hydraulic fluid prior to delivery of the fluid to hydraulic pump 26.

Hydraulic fluid is delivered under pressure to hydraulic motor 40 which in turn effects motion to hydraulic drive shaft 54. In a preferred embodiment, hydraulic motor 40 is capable of delivering 10 horsepower at 1500 r.p.m. Pulley 60 is selectively driven by hydraulic motor 40 through the use of electromagnetic clutch 56 mounted on shaft 54. During operation of auxiliary system 10, a signal is generated by control panel 58 and transmitted to normally open pressure switch 44 which is set at a predetermined level. If the pressure of hydraulic fluid within outgoing line 36 is equal to or greater than the predetermined level, switch 44 relays a signal back to control panel 58 which in turn delivers current to clutch 56, thereby engaging auxiliary power system 10. This fail safe mechanism prevents auxiliary system 10 from being engaged before it is able to develop sufficient power.

In the embodiment of the present invention depicted in FIG. 1, pulley 60 is connected to pulley 64 via belt 62. When auxiliary system 10 is not engaged, pulley 60 is disengaged from hydraulic drive shaft 54 of motor 40 and thus operates as an idler. However, when auxiliary system 10 is engaged, pulley 60 causes the rotation of pulley 64 via belt 62.

In the preferred embodiment of the present invention, clutched drive hub assembly 66 is provided on main fan hub 16. Clutched drive hub assembly 66 selectively engages and disengages fan hub 16 from primary engine 14. Clutched drive hub assembly 66 causes fan hub 16 to be disengaged from primary engine 14 when hydraulic motor 40 is connected to pulley 60 through clutch 56. Conversely, clutched drive hub assembly 66 causes fan hub 16 to be engaged with primary engine 14 when clutch 56 disengages pulley 60 from hydraulic motor 40. In this way, fan hub 16 is driven by either primary engine 14 or auxiliary engine 12.

Clutched drive hub assembly 66 is preferably an air clutched hub capable of being engaged by the application of air from an air pressure source and disengaged by a spring mechanism. Solenoid 68 is connected to clutched drive hub assembly 66 in order to selectively apply air pressure thereto. Electric solenoid 68 is operated via control panel 58.

In an alternative embodiment of the present invention, hydraulic motor 40 can be selectively coupled to main fan hub 16 directly, thereby obviating the need for belt 62 and pulleys 60, 64. It will, however, be appreciated that use of this alternative embodiment of the present invention is limited by the availability of space within certain vehicles.

Auxiliary power system 10 includes a cooling system 70 which is mounted in fluid communication with cooling system 72 associated with primary engine 14. Auxiliary cooling system 70 includes coolant intake line 74. One way valve 76 is disposed within coolant intake line 74 proximal auxiliary engine 12 in order to control flow within auxiliary cooling system 70. Coolant enters auxiliary engine 12 through intake line 74 and exits through outgoing coolant line 78, thereby providing for the cooling of auxiliary engine 12, as discussed in greater detail below.

Coolant exiting auxiliary engine 12 travels through outgoing coolant line 78 to primary engine 14. A one way valve 80 is disposed within line 78 in order to control the flow of coolant therein. It is to be appreciated that one way valves 76, 80 serve to isolate the auxiliary power system of the present invention from the primary engine during normal operation of the primary engine.

In the preferred embodiment of the present invention, coolant temperature sensor 82 is provided in order to monitor the temperature of coolant within line 78. If the temperature of coolant within line 78 exceeds a predetermined value, sensor 82 signals coolant fan 84 to begin operation. If the temperature of coolant within line 78 exceeds a second predetermined value, sensor 82 signals high coolant temperature shutoff switch 86 to effect the shutdown of auxiliary engine 12.

It is to be appreciated that the temperature of coolant within line 78 will be relatively warmer than the temperature of coolant entering auxiliary engine 12 from intake line 74. Thus, excess heat produced by the operation of auxiliary engine 12 will be delivered to primary engine 14 and effect the warming thereof. This warming effect is particularly important when the auxiliary power system of the present invention is operated in cold climates due to the high levels of engine wear commonly associated with cold engine starts.

Main cooling system 72 includes outgoing coolant conduit 88 and return coolant conduit 90. Coolant from within primary engine 14 flows through outgoing coolant conduit 88, through radiator 92, and returns to primary engine 14 through conduit 90 in order to provide for the cooling of primary engine 14. Intake line 74 is fluidly connected to outgoing coolant conduit 88 such that a portion of the coolant is directed through line 74 to auxiliary engine 12. Coolant within line 74 is thus used to cool auxiliary engine 12 during use.

In a preferred embodiment of the present invention, coolant fan mechanism 84 includes four electrical fans surrounded by a single shroud. The four fans are connected by built-in electrical relays. The electrical fans and the shroud can be mounted in lieu of the existing fan and shroud associated with the radiator of various vehicles. Fan mechanism 84 is preferably activated by sensor 82 when the temperature of coolant within the auxiliary and primary engines exceeds a predetermined value, as discussed above.

Although the auxiliary power system of the present invention has been described in detail herein with respect to specific preferred embodiments, it will be evident that various and further modifications are possible without departing from the true spirit and scope of the present invention.

What is claimed is:

1. An auxiliary power system for causing the rotation of a fan hub of a motor of a vehicle during periods of shutdown of said motor, said fan hub being capable of driving an air conditioning compressor and an alternator mounted in said vehicle, comprising:

an auxiliary engine;

an hydraulic pump, said hydraulic pump being mechanically connected to said auxiliary engine whereby said auxiliary engine causes the operation of said pump, said pump being fluidly connected to a reservoir of hydraulic fluid;

an outgoing hydraulic line capable of delivering pressurized hydraulic fluid from said hydraulic pump to an hydraulic motor;

an incoming hydraulic line capable of delivering hydraulic fluid from said hydraulic motor to said hydraulic pump;

a first clutch assembly, said clutch assembly being capable of selectively coupling said hydraulic motor to said fan hub of said vehicle whereby power from said auxiliary engine causes said fan hub to rotate when said clutch assembly couples said hydraulic motor to said fan hub, and whereby said air conditioner compressor and said alternator are driven by said auxiliary engine; and a second clutch assembly, said second clutch assembly being capable of selectively coupling said motor to said fan hub whereby said second clutch assembly causes said motor to disengage from said fan hub when said first clutch assembly causes said hydraulic motor to be coupled to said fan hub.

2. The auxiliary power system of claim 1 wherein said first clutch is electromagnetically controlled.

3. The auxiliary power system of claim 2 wherein said first clutch includes a first fail safe mechanism, said first fail safe mechanism comprising a sensor for sensing pressure within said outgoing hydraulic line and a signal generating control whereby said signal generating control enables operation of said first clutch when said sensor senses pressure within said outgoing hydraulic line greater than a predetermined minimum pressure.

4. The auxiliary power system of claim 1 wherein said second clutch assembly is spring-biased whereby said hydraulic motor is urged out of engagement with said fan hub.

5. The auxiliary power system of claim 4 wherein said second clutch assembly is pneumatically operated whereby application of air pressure to said second clutch assembly urges said hydraulic motor into engagement with said fan hub.

6. The auxiliary power system of claim 1 wherein said first clutch assembly further comprises a first pulley mounted for selective engagement with said hydraulic motor, a second pulley mounted on said fan hub, and a belt connecting said first pulley and said second pulley whereby said first pulley, said second pulley, and said fan hub are operated by said hydraulic motor when said first clutch assembly causes said first pulley to engage said hydraulic motor and whereby said first pulley operates as an idler when said first clutch assembly causes said first pulley to be disengaged from said hydraulic motor.

7. The auxiliary power system of claim I further comprising an auxiliary coolant system, said auxiliary coolant system comprising a first coolant tube and a second coolant tube, said first coolant tube having a first end and a second end, said first end of said first coolant tube mounted in fluid communication with said auxiliary engine and said second end of said first coolant tube mounted in fluid communication with said motor and said second coolant tube having a first end and a second end, said first end of said second coolant tube mounted in fluid communication with said motor and said second end of said second tube mounted in fluid communication with said auxiliary engine whereby coolant can be circulated through said auxiliary engine and said motor through said first coolant tube and said second coolant tube.

8. The auxiliary power system of claim 7 wherein a first one way valve is mounted within said first coolant tube whereby flow through said first coolant tube is restricted to flow from said first end to said second end of said first coolant tube and wherein a second one way valve is mounted within said second coolant tube whereby flow through said second coolant tube is restricted to flow from said first end to said second end of said second coolant tube.

9. The auxiliary power system of claim 8 further comprising a fan mechanism for cooling coolant within said auxiliary coolant system.

10. The auxiliary power system of claim 9 wherein said fan mechanism comprises a plurality of fans electrically connected to said alternator.

11. The auxiliary power system of claim 1 further comprising an hydraulic oil cooler disposed along said incoming hydraulic line whereby hydraulic fluid within said incoming hydraulic line is cooled before returning to said hydraulic pump.

12. The auxiliary power system of claim 11 wherein said hydraulic fluid cooler comprises a fan and a receptacle having baffles mounted therein, said receptacle mounted in fluid communication with said incoming hydraulic line, whereby hydraulic fluid passing through said incoming hydraulic line passes through said receptacle and whereby hydraulic fluid within said receptacle is cooled by said fan.

13. An auxiliary power system for causing the rotation of a fan hub of a motor of a vehicle during periods of shutdown of said motor, said fan hub being capable of driving an air conditioning compressor and an alternator mounted in said vehicle, comprising:

an auxiliary engine;

an hydraulic pump, said hydraulic pump being mechanically connected to said auxiliary engine whereby said auxiliary engine causes the operation of said pump, said pump being fluidly connected to a reservoir of hydraulic fluid;

an outgoing hydraulic line capable of delivering pressurized hydraulic fluid from said hydraulic pump to an hydraulic motor;

an incoming hydraulic line capable of delivering hydraulic fluid from said hydraulic motor to said hydraulic pump;

a first clutch assembly, said clutch assembly being capable of selectively coupling said hydraulic motor to said fan hub of said vehicle whereby power from said auxiliary engine causes said fan hub to rotate when said clutch assembly couples said hydraulic motor to said fan hub, and whereby said air conditioner compressor and said alternator are driven by said auxiliary engine;

a second clutch assembly, said second clutch assembly being capable of selectively coupling said motor to said fan hub whereby said second clutch assembly causes said motor to disengage from said fan hub when said first clutch assembly causes said hydraulic motor to be coupled to said fan hub; and an auxiliary coolant system, said auxiliary coolant system comprising a first coolant tube and a second coolant tube, said first coolant tube having a first end and a second end, said first end of said first coolant tube mounted in fluid communication with said auxiliary engine and said second end of said first coolant tube mounted in fluid communication with said motor and said second coolant tube having a first end and a second end, said first end of said second coolant tube mounted in fluid communication with said motor and said second end of said second tube mounted in fluid communication with said auxiliary engine whereby coolant can be circulated through said auxiliary engine and said motor through said first coolant tube and said second coolant tube.

14. The auxiliary power system of claim 13 wherein said first clutch is electromagnetically controlled.

15. The auxiliary power system of claim 14 wherein said first clutch includes a first fail safe mechanism, said first fail safe mechanism comprising a sensor for sensing pressure within said outgoing hydraulic line and a signal generating control whereby said signal generating control enables operation of said first clutch when said sensor senses pressure within said outgoing hydraulic line greater than a predetermined minimum pressure.

16. The auxiliary power system of claim 13 wherein said second clutch assembly is spring-biased whereby said hydraulic motor is urged out of engagement with said fan hub.

17. The auxiliary power system of claim 16 wherein said second clutch assembly is pneumatically operated whereby application of air pressure to said second clutch assembly urges said hydraulic motor into engagement with said fan hub.

18. An auxiliary power system for causing the rotation of a fan hub of a motor of a vehicle during periods of shutdown of said motor, said fan hub being capable of driving an air conditioning compressor and an alternator mounted in said vehicle, comprising:
   an auxiliary engine;
   an hydraulic pump, said hydraulic pump being mechanically connected to said auxiliary engine whereby said auxiliary engine causes the operation of said pump, said pump being fluidly connected to a reservoir of hydraulic fluid;
   an outgoing hydraulic line capable of delivering presurized hydraulic fluid from said hydraulic pump to an hydraulic motor;
   an incoming hydraulic line capable of delivering hydraulic fluid from said hydraulic motor to said hydraulic pump;
   a first electromechanical clutch assembly, said first clutch assembly being capable of selectively coupling said hydraulic motor to said fan hub of said vehicle whereby power from said auxiliary engine causes said fan hub to rotate when said clutch assembly couples said hydraulic motor to said fan hub, and whereby said air conditioner compressor and said alternator are driven by said auxiliary engine, said first clutch including a first fail safe mechanism, said first fail safe mechanism comprising a sensor for sensing pressure within said outgoing hydraulic line and a signal generating control whereby said signal generating control enables operation of said first clutch when said sensor senses pressure within said outgoing hydraulic line greater than a predetermined minimum pressure;
   a second clutch assembly, said second clutch assembly said second clutch assembly being capable of selectively coupling said motor to said fan hub whereby said second clutch assembly causes said motor to disengage from said fan hub when said first clutch assembly causes said hydraulic motor to be coupled to said fan hub; and
   an auxiliary coolant system, said auxiliary coolant system comprising a first coolant tube and a second coolant tube, said first coolant tube having a first end and a second end, said first end of said first coolant tube mounted in fluid communication with said auxiliary engine and said second end of said first coolant tube mounted in fluid communication with said motor and said second coolant tube having a first end and a second end, said first end of said second coolant tube mounted in fluid communication with said motor and said second end of said second tube mounted in fluid communication with said auxiliary engine whereby coolant can be circulated through said auxiliary engine and said motor through said first coolant tube and said second coolant tube.

19. The auxiliary power system of claim 18 wherein said auxiliary engine has a capacity of at least 9 horsepower.

20. The auxiliary power system of claim 19 wherein said auxiliary engine has a capacity of 11-13 horsepower.

* * * * *